United States Patent
Carcagno et al.

(10) Patent No.: US 8,052,173 B2
(45) Date of Patent: Nov. 8, 2011

(54) THREADED CONNECTIONS WITH HIGH AND LOW FRICTION COATINGS

(75) Inventors: Gabriel E. Carcagno, Buenos Aires (AR); Ernesto Gallo, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 230 days.

(21) Appl. No.: 12/095,386

(22) PCT Filed: Nov. 29, 2006

(86) PCT No.: PCT/EP2006/069073
§ 371 (c)(1),
(2), (4) Date: Aug. 27, 2008

(87) PCT Pub. No.: WO2007/063079
PCT Pub. Date: Jun. 7, 2007

(65) Prior Publication Data
US 2009/0033087 A1    Feb. 5, 2009

(30) Foreign Application Priority Data
Nov. 30, 2005   (WO) ................. PCT/EP2005/056344

(51) Int. Cl.
 *F16L 58/02*  (2006.01)
 *F16L 57/06*  (2006.01)
 *F16L 15/00*  (2006.01)
(52) U.S. Cl. ............................. 285/94; 285/55; 285/333
(58) Field of Classification Search ................ 285/55, 285/94, 333
See application file for complete search history.

(56) References Cited

U.S. PATENT DOCUMENTS

| 633,325 | A | * | 9/1899 | Luke ............................... 285/333 |
| 2,733,802 | A | | 2/1956 | Truesdell .......................... 194/9 |
| 2,741,288 | A | | 4/1956 | Johnson ............................ 151/7 |
| 4,414,247 | A | | 11/1983 | Hubecker et al. ............. 427/230 |
| 4,468,309 | A | * | 8/1984 | White ............................. 285/55 |

(Continued)

FOREIGN PATENT DOCUMENTS

DE         2733802 A1    2/1979

(Continued)

OTHER PUBLICATIONS

Feb. 27, 2009 European Office Action in European Patent Appln. No. 06841276.6.

(Continued)

*Primary Examiner* — James Hewitt
(74) *Attorney, Agent, or Firm* — Fitzpatrick, Cella, Harper & Scinto

(57) ABSTRACT

A threaded metallic joint has the thread surface of pin (100) and box (200) covered with a coating comprising a first layer (24) laid on the overall surface of the pin member (100), and a second layer (25) laid on part of the surfaces of either one of the pin or box members. In a first aspect, the coating comprises a first layer with high friction and anti-seize properties laid on the overall surface of the pin member (100), and a second layer (25) with low friction properties laid on specific parts of the surfaces of either one of the pin or box members. Preferably the specific surfaces are those which are in reciprocal radial contact during make-up until pin and box reach the point where shoulders (9, 10) abut. The second layer may contain polytetrafluoroethylene (PTFE). In a second aspect the first layer with a high friction and anti-seize properties laid on the overall surface of the box member (200).

30 Claims, 6 Drawing Sheets

U.S. PATENT DOCUMENTS

| | | | |
|---|---|---|---|
| 4,474,651 A * | 10/1984 | Yauchi et al. | |
| 4,692,988 A | 9/1987 | Shulver et al. | 29/458 |
| 4,830,411 A * | 5/1989 | Tsuru et al. | |
| 5,253,902 A * | 10/1993 | Petelot et al. | 285/94 |
| 6,027,145 A | 2/2000 | Tsuru et al. | 285/94 |
| 6,394,190 B2 * | 5/2002 | Linden | 285/55 |
| 6,746,057 B2 | 6/2004 | Goto et al. | 285/94 |
| 2003/0160446 A1 | 8/2003 | Goto et al. | 285/94 |
| 2004/0195826 A1 * | 10/2004 | Goto | 285/94 |
| 2004/0239105 A1 * | 12/2004 | Matsumoto et al. | 285/94 |

FOREIGN PATENT DOCUMENTS

DE      3432001 C1      10/1985

OTHER PUBLICATIONS

T. Castineiras, et al., "Dry Dope-free OCTG Connections: A novel Environmentallly Friendly Technology Validated Through Diverse and Severe Field Conditions", SPE/IADC Drilling Conference and Exhibition, Amsterdam, The Netherlands, (Mar. 17-19, 2009); pp. 1-12.

* cited by examiner

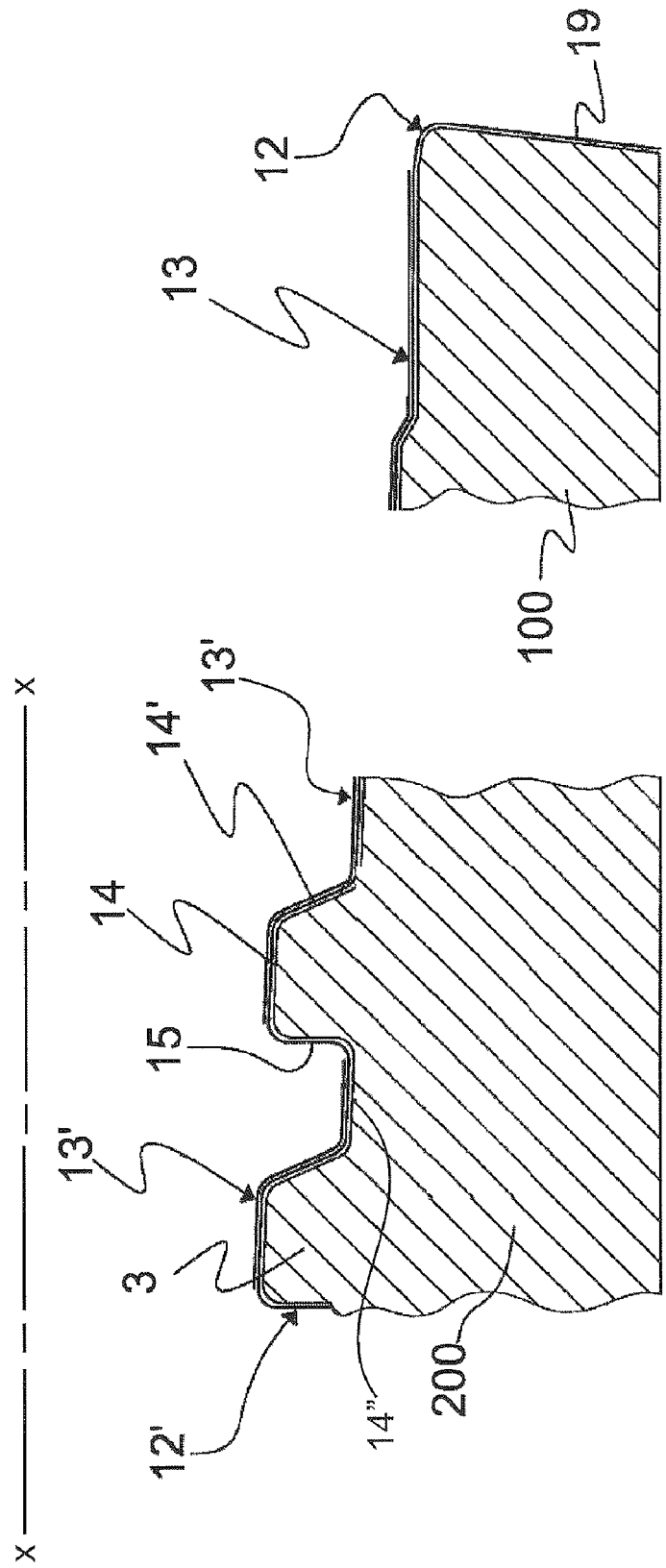

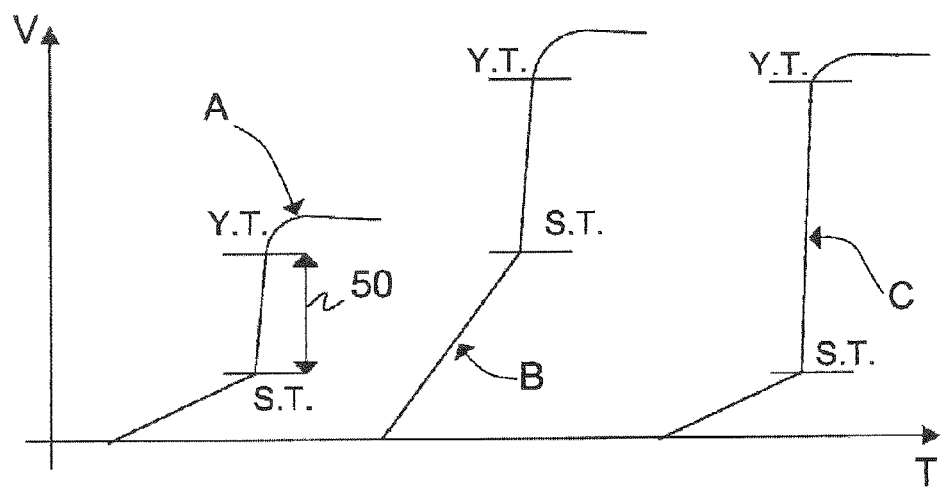
Fig. 4
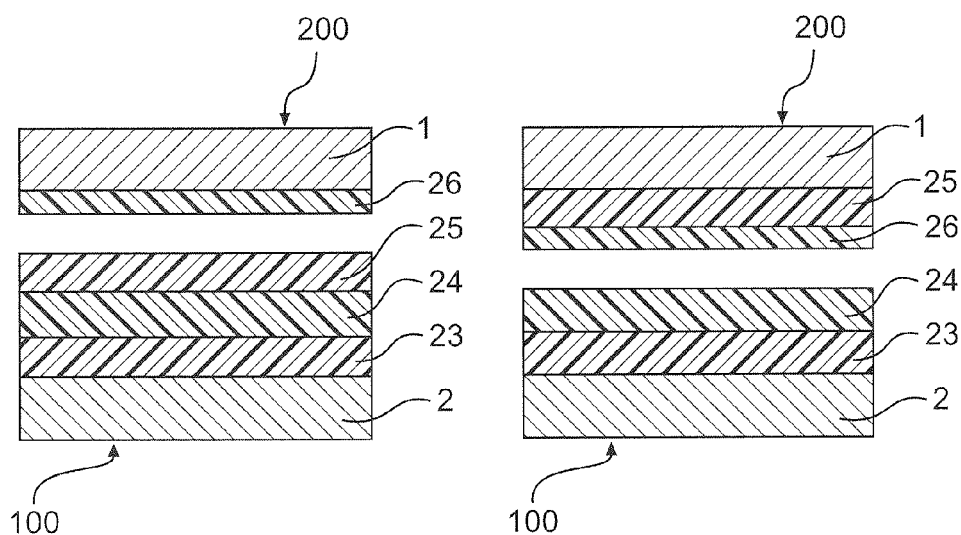
Fig. 5                    Fig. 6

THREADED CONNECTIONS WITH HIGH AND LOW FRICTION COATINGS

TECHNICAL FIELD

The present invention relates to a threaded joint, particularly adapted for connecting pipe segments to make strings used in the oil and gas extraction industry, provided with a surface coating covering the thread to enhance torsional joint strength.

BACKGROUND ART

In oil prospecting and extraction it is common practice to use metallic pipes of a commercial length, which are made-up to form a string long enough to reach the depths in which oil or gas reservoirs or pools are located. The depth of reservoirs is increasing constantly and therefore the joints have to be designed in such a manner that they can withstand higher loads and stresses while ensuring good sealing properties.

An improvement of the performances of threaded joints is achieved by appropriate design of all load bearing surfaces of the pin and the box, i.e. thread flanks, abutment shoulders etc., to make them maintain reciprocal contact with appropriate structural and dimensional interference in all load ranges under which the joints are expected to operate. This depends on the intensity of torque that can be applied, whereby torque intensity is determined by the difference between the value of yield torque and the value of shoulder torque.

However, the provision of too high an interference is detrimental for make-up operation, since this can cause seizure or galling of the joint. Efforts have been made to reach a good balance between having a low make-up torque and having high yield torque, which is a condition for withstanding high loads and having good sealing properties.

On one side, to avoid seizure during make-up, state of the art technology generally uses a fluid lubricant, e.g. grease or dope.

Efforts are also made to increase yield torque limit, which has always been an important issue for research in this technical field. Yield torque (Y.T.) was increased generally by modifying the joint design, but it has now come close to its technical limit for doped joints.

Use of dope in turn has drawbacks and would preferably be avoided. The risks posed by the use of dope include: dirt entrapment; non-uniform distribution of dope because of manual operation, which might also cause overdoping in all or part of the joint; and cleaning of the joints that has to be carried out in the oilfield in adverse environmental conditions.

Therefore, to reduce costs and improve operations dope free solutions for joints have been developed and have been in use for several years. Dope-free solutions have achieved a good torsional strength, but in some cases they have drawbacks because the make-up torque can reach high values. In such cases make-up torque of dope free solutions for joints is usually lowered by adding oils or contaminants, thus losing partly or totally the advantages of dope free techniques and causing the risk of reducing also the value of yield torque and of overtorquing the joint.

Dope free solutions for joints have been disclosed in several patents, e.g. U.S. Pat. No. 4,414,247, U.S. Pat. No. 6,027,145, and U.S. Pat. No. 4,692,988. They use a single anti-seize coating instead of dope with the same friction factor in all points of the joint surface. An appropriate friction value must also be chosen for such joints, because an increase of the friction factor to enhance the yield torque value increases also the shoulder torque, whereas a reduction of the friction factor allows performing make-up with values of shoulder torque similar to that of known doped joints but reduces its yield torque value. The consequences in both cases are that the value of torque is low and unsatisfactory.

SUMMARY OF THE INVENTION

The main object of this invention is to eliminate the above-mentioned drawbacks by means of a threaded joint for pipes, with excellent make-up properties and still achieve high structural performances by providing a torque with very high value. It is also another object of the invention to provide a threaded joint which also has good corrosion resistance within the widest range of environmental and operational conditions, assuring optimum performance even after several make-up and break-out operations of the joint.

The above mentioned objects, and others that will become apparent in view of the following description, are achieved according to the present invention, by means of a threaded joint for pipes comprising a pin member and a box member, the pin member having a thread adapted to match a thread of the box member, a thread form of each of the pin member and the box member being defined by a thread profile that lays on a cross-section containing a longitudinal axis (X) of the joint, wherein the surface of the thread is provided with a coating wherein said coating comprises a first layer laid on the overall surface of the pin member, a second layer laid on specific parts of the overall surfaces of either one of pin or box members, or the coating comprises a first layer laid on the overall surface of the box member, a second layer laid on specific parts of the overall surfaces of either one of pin or box members.

In a first aspect, the coating comprises a first layer with high friction and anti-seize properties laid on the overall surface of the pin or box members, a second layer with low friction proprieties laid on specific parts of the overall surfaces of either one of pin or box members.

Preferably the overall surfaces of either one of pin or box members where a second layer with low friction properties laid in specific parts are those adapted to produce reciprocal radial contact.

More preferably the parts of the surface of either one of pin or box members where a second layer with low friction properties is laid are those adapted to produce reciprocal radial contact during make-up until a surface withstanding an axial contact pressure load abut (like shoulders).

More preferably, the parts adapted to produce reciprocal radial contact are crests in the box member, roots in the pin member and metal-to-metal seals.

The main advantages of the joint of the invention are the following:

It enables to reach higher torsional strength thanks to the anti-seize dry coating having different friction coefficients on different areas of the joint.

It has thus a low shoulder torque and a high yield torque, increasing the value of admissible torque, allowing an enhancement of torsional strength without changing joint geometry and without increasing the value of the make-up torque.

It overcomes the drawback of state of the art joints which cannot have high friction localised areas because they use lubricants which flow in all spaces left empty between the threads and cover all areas of the joint.

When using dope in joints, the friction factor obtained will depend usually on the dope amount applied, as a dope pressure normally builds up inside the joint because of the small evacuation or compensation space available between the threads of pin and box. Instead in the joint according to the invention the friction factor is independent from operator influence and is determined at the manufacture stage.

According to another important aspect of the invention, a low friction coating is used in specific threaded areas of the pin or box and metal-to-metal seals with radial contact to the complementary surfaces of the box or pin respectively to assure low torque values for make-up, because these are the surfaces that are in contact during screwing of the thread, in an unloaded condition.

A high friction coating is used on those surfaces that perform axial contact, e.g. pin nose, torque shoulder and load flank of thread, to provide enhanced torsional strength, because these surfaces withstand the axial contact pressure loads when the pipe connection reaches the final position. Providing torque control in a joint by means of the coating eliminates the main disadvantages of dope free solutions for joints and produces an advantage with respect to the doped joint because it makes it possible to control separately and with high accuracy two different parameters that are closely interrelated in prior art joints.

BRIEF DESCRIPTION OF THE DRAWINGS

The present invention will be now described according to a preferred embodiment thereof, which is given by way of non-limiting example, by means of the accompanying figures where:

FIGS. 3a and 3b respectively show enlarged sectional details of the thread of a box and a pin with a second layer on specific parts of an overall surface of a joint made according to the invention.

FIG. 4 shows comparative graphs relating to shoulder torque values in joints for the three types of coatings for threaded joints.

FIG. 5 shows an enlarged view of the surfaces of a pin and a box incorporated in a joint according to the invention.

FIG. 6 shows an enlarged view of the surfaces of a pin and a box incorporated in another embodiment of a joint according to the invention.

DESCRIPTION OF PREFERRED EMBODIMENTS OF THE INVENTION

Figures 1A, 1B:
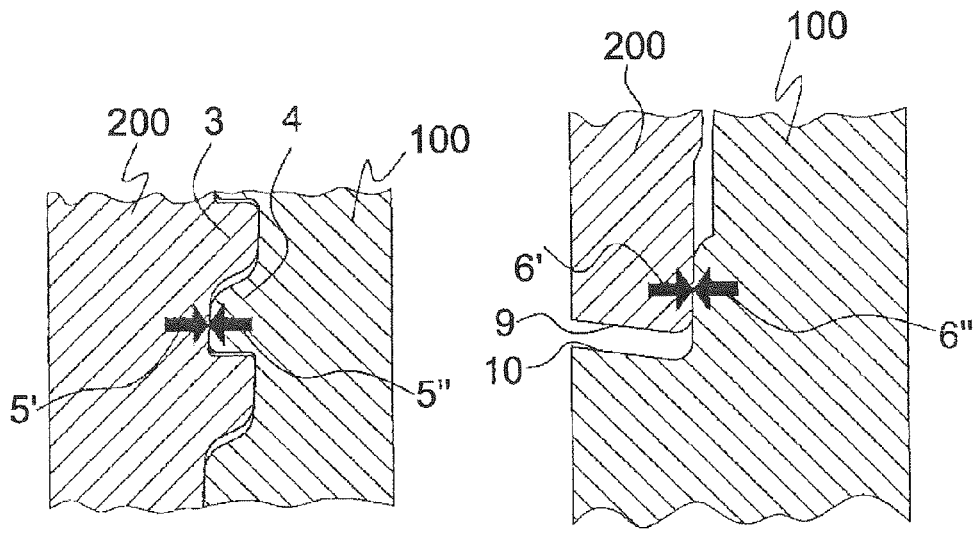
FIGS. 1a and 1b show an enlarged sectional view of a detail of the thread in a joint according to the invention, in a first operating stage (during make up).

With particular reference to FIGS. 1 and 2, a pipe according to the present invention has threaded extremities which, when coupled with another pipe having complementary threaded extremities, forms a joint. A joint thus comprises a pipe defining a male member 100, the so-called "pin", provided with a thread 4 on an external surface, and a female component 200, the so-called "box", having a thread 3 on an internal surface. The box 200 generally is either a pipe or a sleeve, depending on the type of joint. The box 200 has also an abutment shoulder 9 and the pin 100 has a corresponding abutment 10. The FIGS. 1a and 1b show the position of the pin and box before completing the make-up operation, where the abutments 9 and 10 are not yet in contact. At this stage, which corresponds usually to the assemblage of the pipe string, the only important load on the joint is constituted by the contact between the radial surfaces of the thread. The resultant of the stresses caused by the interference provided at the design stage is schematically indicated by the thick arrows 5' and 5". The interference between the thread crests and the thread roots is not high enough to produce a seizure during make-up, using an appropriate lubricant (dope or coating), but generating the hoop tension in components necessary to centralize the pin during running improving its nose positioning.

Also in correspondence of the nose there is provided a radial interference, e.g. for creating a metal-metal seal, which generates stresses the resultant of which is represented schematically by the thick arrows 6' and 6".

Figures 2A, 2B:
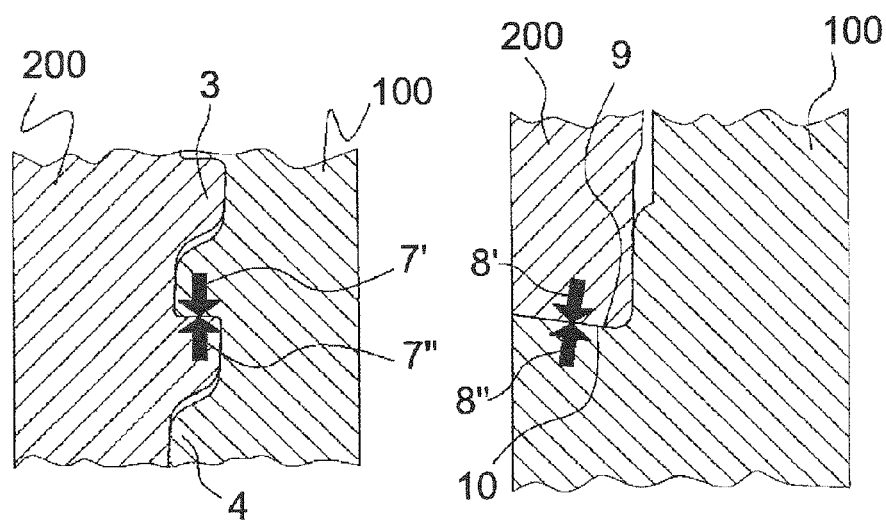
FIGS. 2a and 2b show an enlarged sectional view of a detail of the thread in a joint according to the invention, in a second operating stage (when connection reaches the final position).

In FIGS. 2a and 2b, there are shown the same parts of the threads as in FIGS. 1a and 1b, though in a completely screwed position. In these figures, the resultant of the contact pressure produced by the torque on the flanks of the threads 3 and 4 are represented schematically by the thick arrows 7' and 7", while the resultant of the contact pressures produced by the torque on the abutments 9 and 10 are schematically represented by the thick arrows 8' and 8". The arrows 8' and 8" are close to being parallel to the longitudinal axis X-X of the joint, shown in FIG. 2.

The angle of inclination of the arrows 7', 7" to the axis X-X depends obviously on the inclination of the flanks of the thread, whereas the angle of inclination of the arrows 5', 5", of the thread crests depend on the selected thread design. The direction of arrows 6', 6", 8' and 8" depend on the geometry of the nose. In the thread shown in the figures the radial contact surfaces are close to being perpendicular to the pipe axis with an angle in the range of 90°+/−10° whereas the axial contact surfaces are at an angle to the pipe axis X-X in the range of 0° to +/−25°.

Though the figures show a thread with a trapezoidal tooth the section of the tooth can have other shapes, without departing from the scope of the invention. An enlargement of a thread 3 of the box 200 is shown in FIG. 3a, and an enlargement of an abutment or nose region of a pin 100 is shown in FIG. 3b. A first layer coating 12 on the surface of the overall surface and a second layer coating 13 is shown schematically in FIG. 3b, e.g. in this case on the external surface of the pin 100. As shown in FIG. 3a threaded portion of the box 200 matching the pin 100 can have a perfectly similar first layer 12' and second layer 13' on the surface or it can be made without the protective layer or still alternatively the layer can be made with a different structure or materials. It is also possible to have a coating only on the surface of the pin and no coating on the surface of the box.

The structure of the first layer coating 12 may be different depending on the parts of the joint where it is laid. The difference in the coating tribologic or friction properties allows the manipulation and obtaining different characteristics in threads' behaviour during make up, controlling the necessary torque during the operation.

According to a first aspect of embodiments of the invention, a high friction anti-seize coating, broadly shown as 12 or 12', is deposited over the whole surface of the pin and/or box members whereas a low friction anti-seize coating, broadly shown as 13 or 13', is deposited on areas with radial contact, generally thread crests 14, lead-in flanks 14' and/or roots 14". Preferably, on the thread load flanks 15, on the abutment shoulder and nose area 19, the high friction anti-seize coating 12 or 12' remains as the unique layer.

Alternatively, a high friction anti-seize coating and a contaminant can be used to reduce friction factor on thread crest and/or root.

Because of the different friction factors, this peculiar distribution produces a difference between contact surfaces of pin and box where hoop interference is generated during make-up and the surfaces that get in contact and increase their normal force once pin nose 19 reaches the box abutment shoulder.

The various alternatives of structure and materials making the coatings are now described more in detail with reference in particular to FIGS. 5 and 6.

The layers of the pin 100, in the embodiments of FIGS. 5 and 6, can alternatively constitute the layers of box 200 and vice versa.

FIG. 5 shows an enlarged view of the surfaces of a pin 100 and a box 200 incorporated in a first embodiment of the joint of the invention.

This configuration, particularly adapted for carbon steel or CRA (corrosion resistant alloys) materials, comprises the following layers:

a first substrate 1 of base metal, either on pin or preferably box in bare condition or with the corresponding surface treatment, such as blasted or preferably phosphatized for carbon steel or cooper-plated in case of CRA;

a second substrate 2 of base metal, either on the box or preferably on the pin in bare condition or with the corresponding surface treatment, such as phosphatized or cooper-plated or preferably blasted;

a corrosion protection layer 23, optional, on the substrate 2, preferably having a thickness between 10 and 25 μm;

a high friction factor anti-seize layer 24 on the substrate 2, typically with $MoS_2$, graphite, and/or Boron Nitride, etc., having a thickness between 10 and 25 μm;

a low friction factor anti-seize layer 25 on the substrate 2, such as fluoropolymers (e.g., polytetrafluoroethylene), of thickness comprised between 15 to 40 μm; and a corrosion inhibitor layer 26, optional, on the substrate 1.

In the joint of the invention, the low friction factor layer 25 is not laid on surfaces that have axial contact during make-up operation.

The corrosion protection layer 23 could be avoided in case that the high friction factor anti-seize layer 24 acts as protective coating, too.

In case of using contaminants in order to reduce friction, localized on particular areas, the thickness of the low friction factor anti-seize layer 25 could be negligible. Advantageously, a primer could be used to assure adherence.

FIG. 6 shows an enlarged view of the surfaces of a pin 100 and a box 200 incorporated in a second embodiment of the joint according to the invention.

In this embodiment the low friction factor anti-seize layer 25, such as fluoropolymers (e.g., polytetrafluoroethylene), is laid on the substrate 2 as intermediate layer between the substrate 2 of base metal and the optional corrosion inhibitor 26.

The low friction factor anti-seize layer 25 can be applied on the opposite member of the threaded joint, too.

Also in this second embodiment the layer 25 is always absent on surfaces having axial contact.

All these layers, of appropriate materials and thickness, on the opposite members of the threaded joint increase the joint radial interference, but this difference could be advantageously compensated for during thread machining.

The important factor of the coatings is their friction coefficient, generally not strongly related to the coating thickness. Anyway, the choice of the thickness is related to the durability of the coating, i.e. how many make-up and break-out operations it can withstand.

In a particular embodiment, the anti-seize layer 24 can advantageously incorporate a corrosion protection or it can be applied over a protection layer.

In general, protection coatings have global thicknesses varying in the range from 10 to 40 μm. If the anti-seize layer 24 fulfils both protective and lubricant functions, the overall thickness of the coating of the pin and the box of a joint will be in this range. On the contrary, if anti-seize layer and corrosion protection layer are of different materials, the thickness of the global coating will be greater.

In some cases a low friction factor coating is applied over the high friction coating, as illustrated in FIG. 5. In the case of those surfaces of pin and box that have radial contact the thicknesses of the layers are added up, but in case of axial contact surfaces only the high friction coating thickness is considered to obtain the best results.

As to the materials contained in the layers, the anti-seize layer 24 having high friction factor contains graphite, Boron Nitride and/or $MoS_2$ as a lubricant, generally using a polymeric resin as binder (preferably the polymeric resin is an epoxy or ester-epoxy resin), whereas a low friction factor anti-seize layer 25 is preferably based on fluoropolymers (e.g., polytetrafluoroethylene), or can contain nano-particles used like a contaminant on radial contact surfaces, that drastically reduce the friction between surfaces without significant layer thickness.

Friction coefficients of both layers 24, 25 are different. Typically, the high friction coating has a friction coefficient twice or higher than the low friction coating. Typical values for a low friction coating are from 0.02 to 0.05 and for a high friction layer are in the range from 0.05 and 0.12, evaluated in a test made with a ring on disc.

To have an optimal relation between torque, coating thickness and product, generally, the low friction factor layer should be thick enough to cover the entire specific surface during make-up, decreasing the torque; but beyond a specific limit, an excessive thickness increases the contact pressure, increasing also the necessary torque.

The shoulder torque (S.T.) in a crest-to-root type thread premium joint is a function of several factors:

$$S.T.=f(t_p,t_b,\delta,\mu_{th},D_{th},L)+T_s$$

$t_p$: average wall thickness of pin on thread;
$t_b$: average wall thickness of box on thread;
δ: thread interference;
$\mu_{th}$: friction coefficient on radial contact surfaces;
$D_{th}$: average diameter of thread;
L: length of engaged thread;
$T_{s:\,Minimum}$ contribution due to seal interference.

While ΔT, or Delta torque, which is the difference between yield torque (Y.T.) and shoulder torque (S.T.):

$$\Delta T=f(h_n,l_{th},\mu_{sh})$$

$h_n$: Shoulder thickness;
$l_{th}$: lead of the thread (tpi);
$\mu_{sh}$: friction coefficient on axial contact surfaces.

Using high and low friction factors on axial and radial contact surfaces respectively, (typically the high friction coating has a friction coefficient twice or higher than the low friction coating), it is possible to reduce the relation S.T./Y.T., which will enlarge the admissible torque window for a specific joint.

Graphs in FIG. 4 show a comparison between the expected torque-turn graph for the same joint using a low friction coefficient coating (curve A), a high friction coefficient coating (curve B) and localized friction areas (curve C) according to the invention. The graph shows along the abscissae the number of make-up turns of the joint to arrive at an abutment of the shoulders and along the ordinates the torque value applied during make-up.

The performance of the joint is better when the torque curve has a long segment 50 whose value is given by the difference between the values of Y.T. and S.T. The bigger the value of the segment the better the safety provided by the joint. In the FIG. 4 the joint of the invention, that shows a curve corresponding to curve C, has a low friction factor in the radial contact surfaces that provides adequate friction values to assure the make up of the joint at reasonable torque values comparable to those present when using dope; and a high friction factor on axial contact surfaces that provides a localised area with high friction capable of delivering high torsional strength to the joint once the shoulder gets in contact.

Other embodiments of the joint according to the invention provide for different layers depending on the pin or box members on which they are laid or alternatively contaminating different surfaces over the same coating to modify their friction factor.

In another preferred embodiment the layer 24 can also work as a corrosion protector, and the corrosion layer can be avoided.

To enhance the quality of the coating of the joint, a surface treatment is provided in order to improve the adherence of coating to thread surface, e.g. blasting, phosphatisation or cooper-plated.

The surface treatment of the invention can be applied to every type of thread either having a cylindrical or frustoconical shape of the envelope of the crests of the thread or a combination of both having one or more thread steps.

The joint of the present invention can be applied to every type of joint, particularly either in cases when the female member is formed at an end portion of a pipe or when a sleeve with two female members at both ends to join two male pipes is used.

Example 1

A coating system was applied to a connection according to the present invention. A first layer of a Zn-rich epoxy resin was applied to the pin surface (surface roughness Ra comprised between 2-6 μm) as corrosion inhibiting coating. The final thickness of the coating was 20 μm. Over this first layer, a second layer of dry lubricant coating, which is comprised of a mixture of $MoS_2$ and other solid lubricants in an inorganic binder was applied with a thickness of 20 μm. The coatings were applied by spraying and heat was used to accelerate curing.

The inner surface of the box was coated with a low friction coating. The surface of a box was given a phosphatized surface treatment and a polytetrafluoroethylene (PTFE) coating was applied selectively over the crest and metal-to-metal seal of the box. This low friction coating is a polymeric coating that contains PTFE powder dispersed in a reactive epoxy resin and solvent. The solvents were 2-methoxy-1methyl-ethyl acetate and xylene. In order to assure a homogenous dispersion the PTFE powder, the mixture was smoothly stirred for 20 minutes. The resin had a viscosity in the range of 26-28 seconds in Ford No 4 cup at 25° C.

The PTFE dispersion was applied to the box using pneumatic airless sprayers. The dispersion was then cured at 140° C. for 30 minutes. It should be noted that the curing time will vary depending on the temperature used. For example, the epoxy can be cured 60 minutes at 130° C. or for 30 minutes at 140° C. Alternatively, if the epoxy is cured using an infrared lamp, the recommended curing time is approximately 15 minutes at 140-145° C.

The coefficient of friction for the polymeric coating of the present example was determined by applying the coating to a flat disc and to an annular cylinder (ring). The torque transmitted by rotating the ring on the disc is measured. To simulate the box-pin configuration of the present invention, the coatings of the pin were applied to the disc, while the coatings of the box were applied to ring.

Figure 7A:
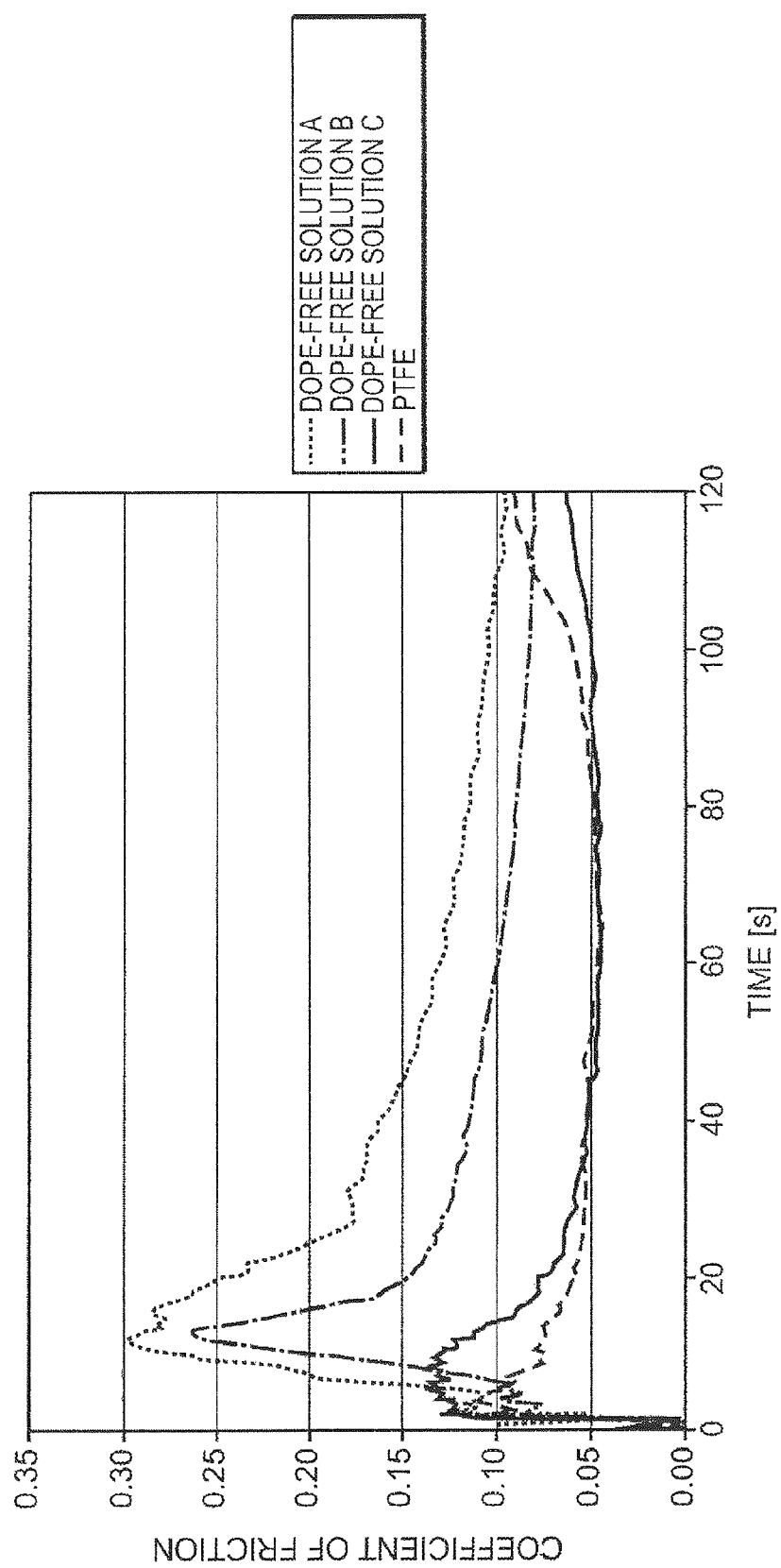
FIG. 7A shows the measured coefficient of friction over time for three types of threaded joints discussed in Example 1.
Figure 7B:
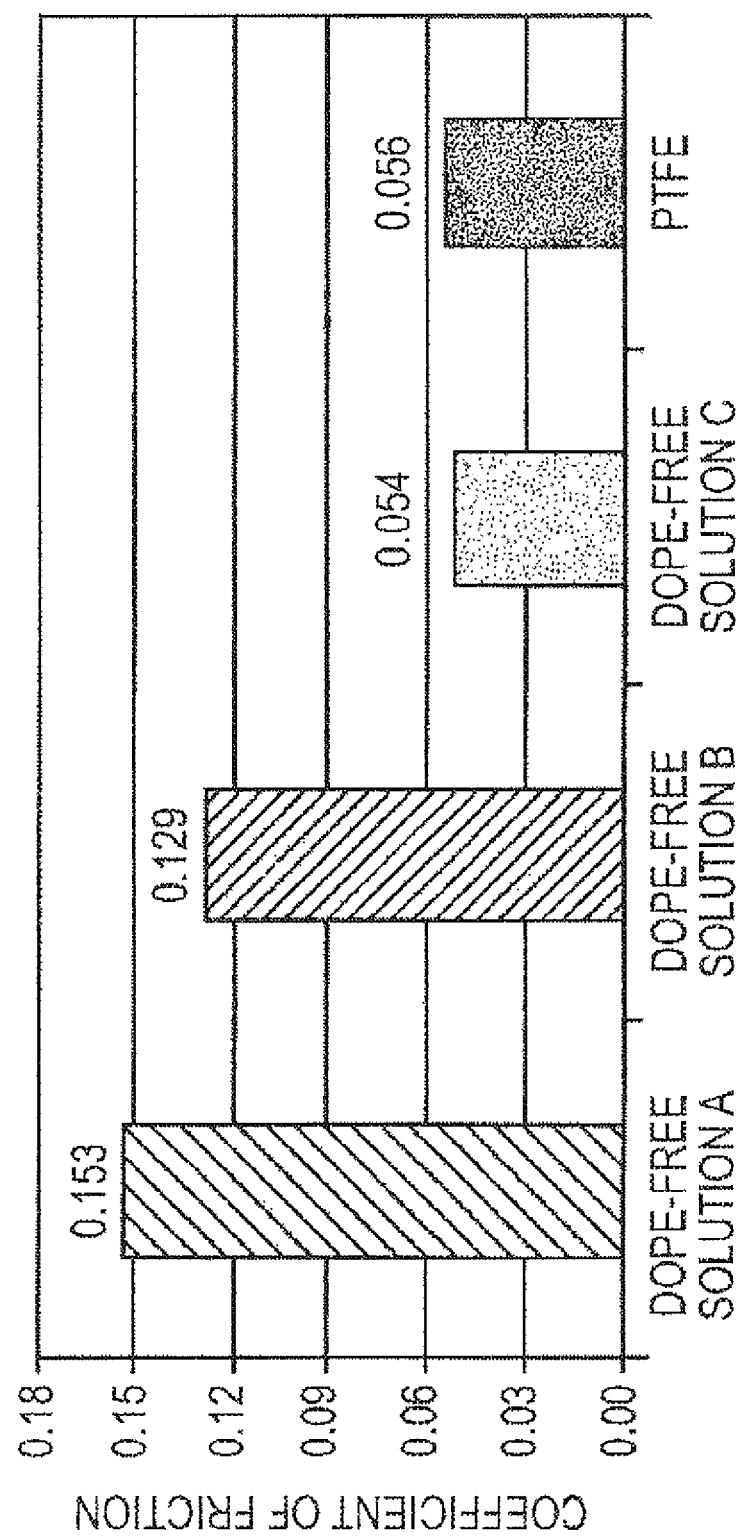
FIG. 7B shows the average coefficient of friction for the three types of threaded joints discussed in Example 1.

FIG. 7A depicts the measured coefficient of friction over time while FIG. 7B displays the average coefficient. In both FIGS. 7A and 7B, three different dope-free systems were compared (Solution A, Solution B, and Solution C). Dope-free solution A had a coating system comprised by a corrosion resistance layer and lubricant layer on the pin. Dope-free solution B had the same coating system as solution A but a corrosion inhibitor layer was applied on top. Dope-free solution C, the solution of the present example, had the coating scheme of solution B applied to the pin and a PTFE coating was applied to specific parts of the inner surface of the box.

As can be seen in FIGS. 7A and 7B, the polymeric coating significantly reduced the coefficient of friction when applied according to the present invention, especially as compared to conventional pin-box configurations.

Figure 8:
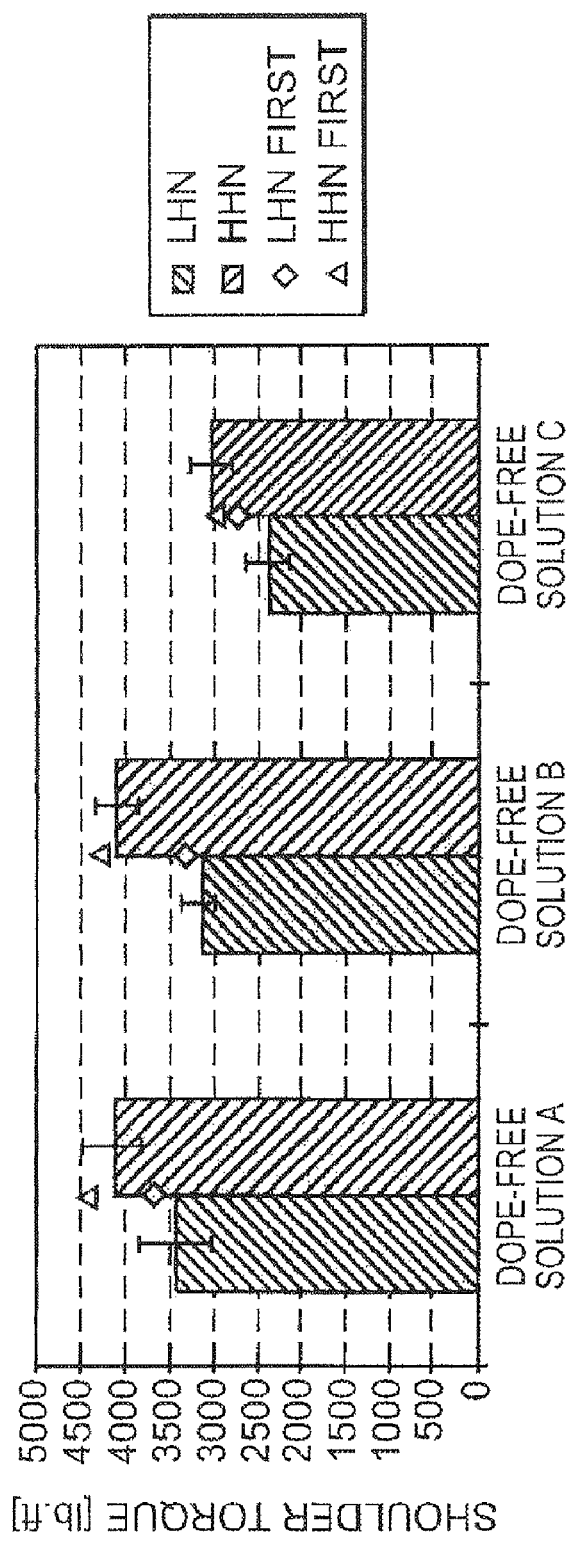
FIG. 8 shows the results of make and break tests that were performed on the three types of threaded joints discussed in Example 1.

In addition to the coefficient of friction tests, make and break tests were performed on 3.5 inch connections. The results of these tests are shown in FIG. 8. In FIG. 8, dope-free solution A, B, and C were evaluated on connections with two different configurations: max thread/max seal and min thread/max seal interference. In FIG. 8, the main bars represent the mean shoulder torque for the first 5 make-ups for each configuration, the dots symbolize the torque shoulder for the first make-up, and the error bars indicate the standard deviation. In the legend, HHN stands for the high thread-high seal interference with nominal thread tapers, while LHN stands for low thread-high seal interference with nominal thread tapers. As can be seen in FIG. 8, application of the PTFE-coating considerably reduced the torque shoulder.

It should be noted that other types of polymeric coatings may be used in addition to the PTFE coating of Example 1 and that Example 1 is not intended to limit the scope of the present invention. As one of ordinary skill in the art would understand, other coatings may be applied either below or above the polymeric coating without departing from the scope of the present invention. For example, a corrosion resistant layer can be applied over the polymeric coating, provided that the corrosion resistant layer does not affect the friction properties of the entire system. Additionally, the various coatings described herein may be applied to the overall surface of the pin member or box member, or only to selected areas. For example, the coatings may be applied to the threaded portions of the pin member and the box member, to the metal-to-metal seal portions of the pin member and the box member, or to the shoulder portion of the pin member and the box member without departing from the scope of the present invention.

The invention claimed is:

1. A dope-free threaded joint for pipes, the joint comprising a pin member (100) and a box member (200), the pin member having a thread adapted to match a thread of the box member, a thread form of each of the pin member and the box member being defined by a thread profile that lays on a cross-section containing a longitudinal axis (X) of the joint, wherein the surface of the pin member is provided with a non-metallic coating comprising a first layer (24) with high friction and anti-seize properties laid on the overall surface of the pin member (100), wherein a second layer (25) with friction properties lower than the friction properties of the non-metallic coating comprising the first layer is laid only on specific parts of the overall surface of the pin member or box member, wherein the specific parts are parts of the surface that produce reciprocal radial contact between the pin member and the box member during make-up until an abutment surface withstanding an axial contact pressure load abuts either one of the pin member or the box member, and wherein a friction coefficient between axial contact surfaces of the pin member and the box member is at least twice a friction coefficient between radial contact surfaces of the pin member and the box member.

2. A dope-free threaded joint according to claim 1, wherein the specific parts adapted to produce reciprocal radial contact are crests in the box member, roots in the pin member and metal-to-metal seals.

3. A dope-free threaded joint for pipes according to claim 1, characterised in that the surface withstanding an axial contact pressure load is a shoulder (9, 10).

4. The dope-free threaded joint for pipes according to claim 1, wherein a layer (26) incorporating corrosion inhibiting material is also applied to the pin member or to the box member.

5. The dope-free threaded joint for pipes according to claim 1, wherein the first layer (24) incorporates a corrosion inhibiting material.

6. The dope-free threaded joint for pipes according to claim 1, wherein a corrosion protection layer (23) is applied before the first layer (24).

7. The dope-free threaded joint for pipes according to claim 1, wherein the first layer (24) incorporates $MoS_2$, graphite and/or Boron Nitride, and has a thickness in a range between 10 and 25 μm.

8. The dope-free threaded joint for pipes according to claim 1, wherein the first layer also contains an organic or inorganic polymeric resin as a binder.

9. The dope-free threaded joint for pipes according to claim 8, wherein the polymeric resin is an epoxy or ester-epoxy resin or an inorganic binder capable of being polymerized and crosslinked.

10. The dope-free threaded joint for pipes according to claim 1, wherein the first layer of the coating comprises a layer (23) incorporating a corrosion inhibiting material having a thickness between 10 and 25 μm.

11. The dope-free threaded joint for pipes according to claim 1, wherein either the pin member or the box member is metal in bare condition or has a surface treatment chosen among blasting, phosphatisation or copper plating before the non-metallic coating or the second layer are applied.

12. The dope-free threaded joint for pipes according to claim 1, wherein the second layer (25) contains fluoropolymers and has a thickness in a range between 15 to 40 μm.

13. The dope-free threaded joint for pipes according to claim 1, wherein the second layer (25) can contain nanoparticles.

14. The dope-free threaded joint for pipes according to claim 1, wherein the values for the friction coefficient between the radial contact surfaces of the pin member and the box member are from 0.02 to 0.05 and the values for the friction coefficient between the axial contact surfaces of the pin member and the box member are in the range from 0.05 and 0.12.

15. The dope-free threaded joint for pipes according to claim 1, wherein either the pin member and/or the box member are from carbon steel or corrosion resistant alloys materials.

16. The dope-free threaded joint for pipes according to claim 1, wherein the second layer (25) contains PTFE.

17. A dope-free threaded joint for pipes comprising a pin member (100) and a box member (200), the pin member having a thread adapted to match a thread of the box member, a thread form of each of the pin member and the box member being defined by a thread profile that lays on a cross-section containing a longitudinal axis (X) of the joint, wherein the surface of the box member is provided with a non-metallic coating comprising a first layer (24) with high friction and anti-seize properties laid on the overall surface of the box member (200), wherein a second layer (25) with friction properties lower than the friction properties of the non-metallic coating comprising the first layer is laid only on specific parts of the overall surface of either the pin member or the box member, wherein the specific parts are parts of the surface that produce reciprocal radial contact between the pin member and the box member during make-up until an abutment surface withstanding an axial contact pressure load abuts either one of the pin member or the box member, wherein further a friction coefficient between axial contact surfaces of the pin member and the box member is higher than a friction coefficient between radial contact surfaces of the pin member and the box member.

18. A dope-free threaded joint for pipes according to claim 17, characterised in that the surface withstanding an axial contact pressure load is a shoulder (9, 10).

19. A dope-free threaded joint for pipes according to claim 17, wherein the specific parts adapted to produce reciprocal radial contact are crests in the box member, roots in the pin member and metal-to-metal seals.

20. The dope-free threaded joint for pipes according to claim 17, wherein a layer (26) incorporating corrosion inhibiting material is also applied to the box member.

21. The dope-free threaded joint for pipes according to claim 17, wherein the first layer (24) incorporates $MoS_2$, graphite and/or Boron Nitride, and has a thickness in a range between 10 and 25 μm.

22. The dope-free threaded joint for pipes according to claim 17, wherein the first layer of the coating comprises a layer (23) incorporating a corrosion inhibiting material having a thickness between 10 and 25 μm.

23. The dope-free threaded joint for pipes according to claim 17, wherein either the pin member or box member is metal in bare condition or has a surface treatment chosen among blasting, phosphatisation or copper plating before the non-metallic coating or the second layer are applied.

24. The dope-free threaded joint for pipes according to claim 17, wherein the second layer (25) contains fluoropolymers and has a thickness in a range comprised between 15 to 40 μm.

25. The dope-free threaded joint for pipes according to claim 17, wherein the second layer (25) can contain nanoparticles.

26. The dope-free threaded joint for pipes according to claim 17, wherein the values for the friction coefficient between radial contact surfaces of the pin member and the box member are from 0.02 to 0.05 and the values for the friction coefficient between axial contact surfaces of the pin member and the box member are in the range from 0.05 and 0.12.

27. The dope-free threaded joint for pipes according to claim 26, wherein further a friction coefficient between axial contact surfaces of the pin member and the box member is at least twice a friction coefficient between radial contact surfaces of the pin member and the box member.

28. The dope-free threaded joint for pipes according to claim 17, wherein either the pin member and/or the box member are from carbon steel or corrosion resistant alloys materials.

29. The dope-free threaded joint for pipes according to claim 17, wherein the first layer (24) contains PTFE.

30. The dope-free threaded joint for pipes according to claim 17, wherein the second layer (25) contains PTFE.

* * * * *